W. N. WHITELEY.
HARVESTER
No. 169,874.
2 Sheets—Sheet 2.
Patented Nov. 9, 1875.
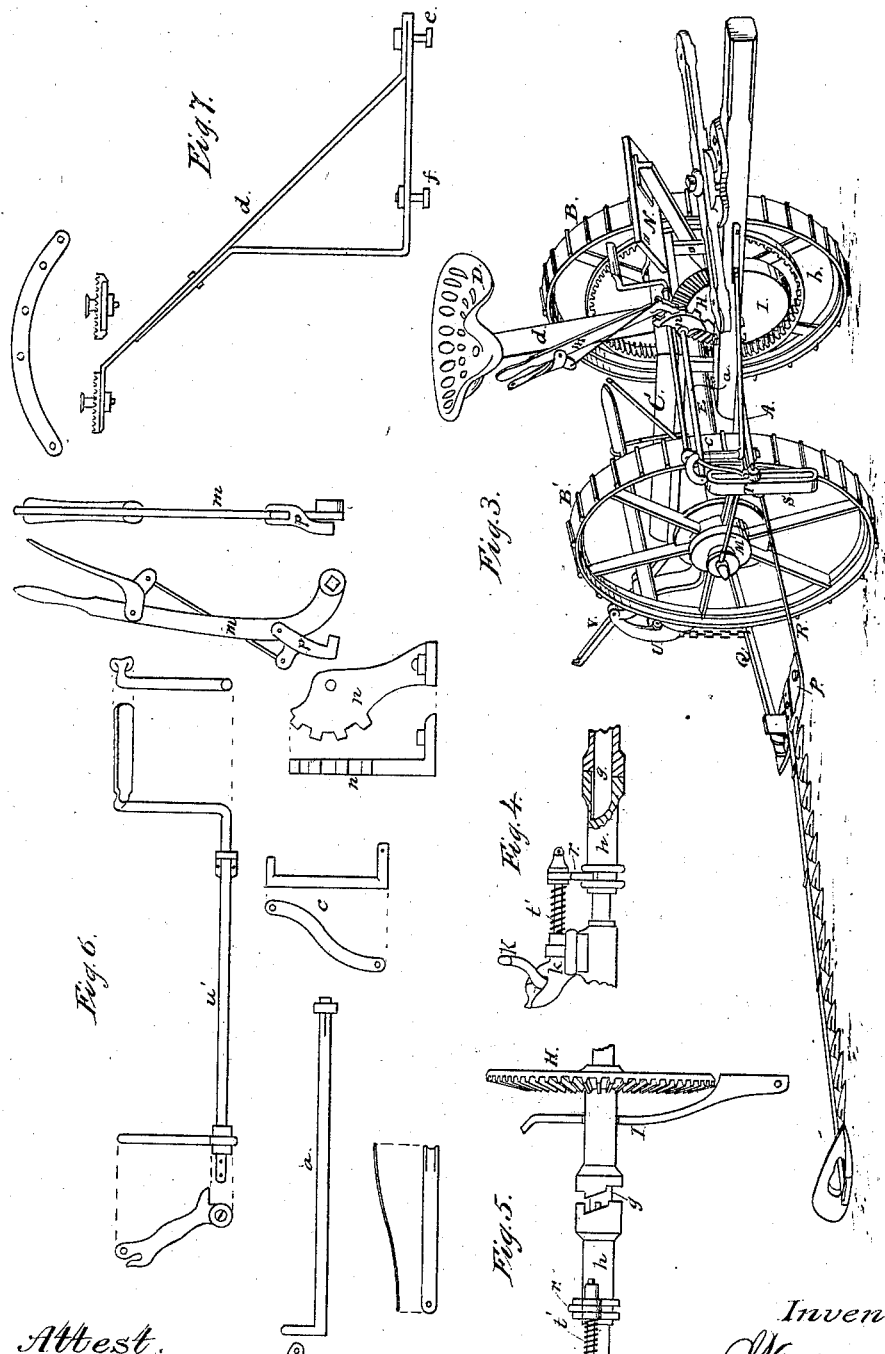
Attest,
J. A. Brown,
F. W. Howard
Inventor,
William N. Whiteley,
By his atty
R. D. O. Smith

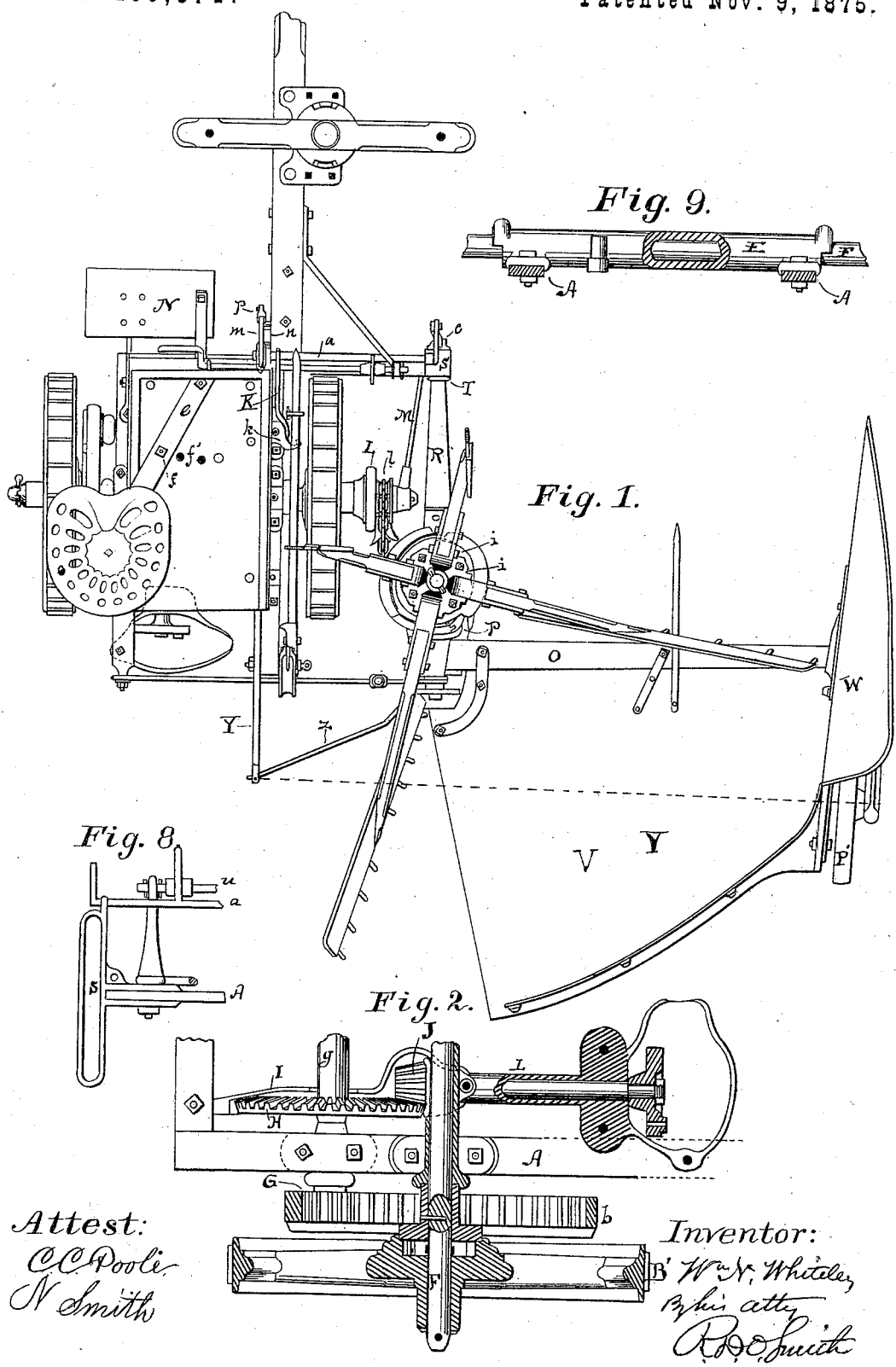

UNITED STATES PATENT OFFICE.

WILLIAM N. WHITELEY, OF SPRINGFIELD, OHIO.

IMPROVEMENT IN HARVESTERS.

Specification forming part of Letters Patent No. 169,874, dated November 9, 1875; application filed April 3, 1874.

CASE B.

*To all whom it may concern:*

Be it known that I, WM. N. WHITELEY, of Springfield, in the county of Clarke and State of Ohio, have invented a new and useful Improvement in Harvesters; and I do hereby declare the following to be a full, clear, and exact description of the same, reference being had to the accompanying drawings, in which—

Figure 1 is a plan view of my invention. Fig. 2 is a horizontal section through main axle-box and main wheel. Fig. 3 is a perspective view of the same, arranged as a mower. Fig. 4 is a sectional elevation of the clutch. Fig. 5 is a plan of the same. Fig. 6 represent details of rock-shafts, &c. Fig. 7 is an elevation of the seat-spring. Fig. 8 is a front elevation, showing drag-bar slot. Fig. 9 is a section elevation of main axle-box.

This invention relates to that class of harvesters known as independent or double-jointed machines; and it consists in the continuous master-wheel axle-box.

That others may fully understand my improvement, I will particularly describe it.

The main frame A is constructed, preferably, of wrought-iron bars riveted or bolted together at their intersections. The frame A is provided with suitable boxes for the reception of the axle of the main driving and supporting wheels B B', and for the counter-shaft and gearing, whereby motion is transmitted to the operative mechanism. A platform, C, is mounted upon said frame A, to support the driver's seat D. The box E, for the master-wheel axle F, is tubular, and extends from one side piece to the opposite one, and is secured to said side pieces by bolts, so that while it forms a bearing and support for, and protects, the axle of the main wheel, it also forms a part of the main frame, and materially augments the strength of the same. An internal gear, *b*, is secured to the main axle F, just within the bearing of the outer wheel B', and it is coupled to said outer wheel by a ratchet and pawl arranged within the hub, so that as said wheel B revolves forward, said wheel *b* and axle are also revolved forward, whereas said wheel B may also revolve freely backward. The internal gear-wheel *b* meshes with a pinion, G, at the end of the counter-shaft *g*, which is parallel with the main axle, and rests in boxes secured to the main frame A. Said pinion is mounted loosely upon the shaft *g*, but is caused to revolve therewith by means of a sliding sleeve, *h*, having clutch-teeth upon its ends, to engage with similar teeth in the end of the hub of wheel H. The wheel H is protected on its face side by a shield-plate, I, and meshes with a pinion, J, on the front end of the crank-shaft *i*, from the rear end of which the cutters are driven by means of a pitman, as usual. The sliding clutch-sleeve *h* is controlled by means of a lever, K, working in a cam-box, *k*. The inner wheel B' drives the rake and reel. A string-brace, M, extends from the inner end of the main axle F to the front cross-bar of the main frame A, to support said axle against any strain incident to the action of the wheel B' in driving the reel. In front of the platform C there is a foot-board, N, mounted upon an arm bolted to the main frame.

The seat D is mounted upon an elastic leg, *d*, made from a single plate of metal, bent in the form of a right-angled triangle, the hypotenuse of which is prolonged to receive the seat. The base of this triangle rests upon the platform C, and is secured thereon by two bolts, *e f*, the former of which is a pivot-bolt, and the latter has a series of holes, *f'*, in the platform, through either one of which it may be inserted, and clamp the leg fast in the desired position.

The cutting apparatus has scalloped cutters and open guards. The finger-bar *o* is bolted at its inner end to a shoe, P. At the outer end said finger-bar is provided with a divider-shoe, and when used for reaping a grain-wheel, P', is also attached to said outer shoe. The shoe P is supported laterally, and connected to the rear of the main frame by a brace, Q, which is jointed at one end to the main frame A, and the other end to the shoe P. A drag-bar or shoe-plate, R, extends from the shoe P forward to the front cross-bar of the main frame, said cross-bar being prolonged from the inner side of the machine for that purpose. The drag-bar R at its front end passes through a vertically-slotted plate, S, which is secured to said front cross-bar of the main frame, and said drag-bar may have a movement up and down in said slot, and thereby cause the points of the guard-fingers to be raised or lowered, as may be required by the condition of the grass or grain in which the machine may be operating. In order to render this movement of the front end of the drag-bar easy, it is placed within a sliding box, T, fitted to slide up and down in the slotted plate S. At the front of the main frame is a rock-shaft, $a$, the inner end whereof is connected to the forward end of drag-bar R by a short connecting-rod, $c$. The rotation of said rock-shaft will then cause the front end of said drag-bar to be elevated or depressed, and said rotation may be produced at the will of the driver by means of a hand-lever, $m$. A stationary notched segment-rack, $n$, and a movable latch, $p$, upon the lever $m$, serve to hold the rock-shaft and drag-bar in position whenever desired.

When this machine is used for mowing, the platform, raking mechanism, divider, and grain-wheel are not employed. The lateral brace Q is then suspended by a chain or other flexible connection from a segment-lever, U, whereby the driver may raise or lower the inner shoe P and the cutting apparatus at will.

When the machine is used for reaping, a platform, V, divider W, and grain-wheel P' are attached to the cutting apparatus. The grain-wheel P' is necessarily mounted at the end of a swinging arm, so that it may be enabled to track properly when the machine is moving on a curved line. The center of the grain-wheel is therefore at some little distance in rear of the finger-bar, and if the inner end of said finger-bar is supported by an attachment, connecting the central part of the lateral brace Q to the main frame, it is obvious that any movement of the front end of the drag-bar up or down will cause the cutting apparatus to move upon an axial line cutting through said point of support for said brace and through the center of the grain-wheel. This line will be oblique to the line of the cutters, and it follows that the cutters at the outer end of the cutting apparatus, being farthest from said axial line, will be moved through a greater distance than the cutters at the inner end of said bar.

One of the chief points of this invention is a method of overcoming this defect. I therefore place a brace, Y, upon the rear end of the main frame A, and project the same backward therefrom to a point about vertical to a line through the center of the grain-wheel P' and parallel with the cutting apparatus. Another brace, Z, is secured rigidly to the inner shoe P, and is projected therefrom upward and backward to a point beneath the end of the brace Y, to which it is then connected by a chain or other flexible connections. This connection forms a supporting-point for the cutting apparatus on a line with the grain-wheel, upon which it may move equally at each end.

The cutters' driving-gear is thrown into and out of gear by means of a clutch-sleeve, $h$, placed upon the counter-shaft and engaging with the sleeve of the bevel-driver H, which is placed loosely upon said shaft. Said clutch-sleeve slides upon a spline set in the counter-shaft, and it is moved forward or backward thereon by means of a clutch-rod, K, having a fork, $r$, at one end. Said clutch-rod is bent in the form of the letter L, the upright portion forming the lever-handle, whereby the clutch is operated. It passes horizontally through a box, $k$, bolted to the side bar of the main frame, and the lever portion rests against the cam-face of the outer end of said box, so that when said lever is thrown over forward said rod may move inward, and the clutch may engage, and when said lever is drawn over backward the cam-face of said box causes the clutch to move outward and the clutch is disengaged. The ends of the cam-face of box $k$ are prolonged and bent around hooking, to receive the clutch-rod lever, and prevent it from being moved too far either forward or backward. A spring, $t'$, automatically moves the clutch-sleeve into engagement when the clutch-lever is thrown forward. The latch-chain or cord is connected to a rock-lever, $w'$, mounted in bearings at the front of the machine, and with a foot-crank at one end so that the said latch may be released by act of the driver's foot whenever he so desires.

When the machine is to be employed for mowing, the platform, divider, and raking mechanism are removed. The lever Z may also be removed, and the supporting-chain may be attached to the clevis on the brace Q and to the segment-lever U, whereby the cutting apparatus may be raised or lowered at the will of the driver.

Having now described my improvement, what I claim as new is—

1. In combination with the bars of the rectangular main frame A, the continuous tubular master-wheel axle-box E, which protects and affords a bearing for the main axle F, and, at the same time, ties the frame together, as set forth.

2. The rock-shaft $a$, substantially as described, combined with the latch-lever $m$, and notched segment $n$, at one end; and the crank and pitman at the other, to actuate and control the front end of the drag-bar R.

W. N. WHITELEY.

Witnesses:
C. C. POOLE,
R. D. O. SMITH.